United States Patent [19]

Quazi

[11] Patent Number: 5,668,778
[45] Date of Patent: Sep. 16, 1997

[54] METHOD FOR DETECTING ACOUSTIC SIGNALS FROM AN UNDERWATER SOURCE

[75] Inventor: Azizul H. Quazi, East Lyme, Conn.

[73] Assignee: The United States of America as represented by the Secretary of the Navy, Washington, D.C.

[21] Appl. No.: 677,205

[22] Filed: Jul. 9, 1996

[51] Int. Cl.$^6$ ................................................. H04B 1/06
[52] U.S. Cl. ........................ 367/135; 367/98; 367/131
[58] Field of Search ........................ 367/135, 136, 367/124, 98, 87, 131; 395/2.09; 364/423

[56] References Cited

U.S. PATENT DOCUMENTS 5,243,686  9/1993  Tokuda et al. ........................ 395/2.09

Primary Examiner—Daniel T. Pihulic
Attorney, Agent, or Firm—Michael J. McGowan; Prithvi C. Lall; Michael F. Oglo

[57] ABSTRACT

A method for detecting radiated and reflected acoustic signals from an underwater source, wherein the acoustic signals are present in a random noise environment and form an output therewith. The method includes the steps of operating an entropy-based acoustic receiver to receive the output, calculating the entropy of the received output, and comparing the calculated entropy with a selected entropy threshold value. A substantial difference is indicative of the presence of an acoustic signal from an underwater source. A less than substantial difference is indicative of a lack of presence of an acoustic signal from an underwater source.

5 Claims, 2 Drawing Sheets

METHOD FOR DETECTING ACOUSTIC SIGNALS FROM AN UNDERWATER SOURCE

STATEMENT OF GOVERNMENT INTEREST

The invention described herein may be manufactured and used by or for the Government of the United States of America for governmental purposes without the payment of royalties thereon or therefor.

BACKGROUND OF THE INVENTION

(1) Field of the Invention

The invention relates to detection of acoustic signals from beneath a water surface and is directed more particularly to detection of signals from an underwater source, wherein the acoustic signals are present in random noise, and which heretofore have gone undetected.

(2) Description of the Prior Art

Conventional acoustic signal processing extracts information from sonar-received signals, using time or frequency domain quantities obtained using spectral analysis. Q. T. Zhang has described an entropy-based receiver for detecting correlated signals present in white noise, both having unknown statistics, as discussed in "An Entropy-based Receiver for the Detection of Random Signals and Its Application to Radar Signal Processing", by Q. T. Zhang, Signal Processing, Vol. 18, pp. 387–396, Elsvier Science Publishers (1989). The basic idea behind the entropy-based approach is that under constant energy constraint, the entropy of a received process having a finite number of sample points is maximum when the process is white (i.e., random) and decreases as it becomes correlated. Results based on simulated data and actual radar data are found in the aforementioned Zhang publication and in "Elements of Information Theory", by T. M. Cover and A. T. Joy, p. 239 (1991). M. S. Hughes has described a novel symbol-oriented information theoretical approach to signal analysis based on the application of Shannon entropy. Hughes shows that Shannon entropy processing can be a preferred alternative to conventional signal analysis by making an experimental comparison of scanned ultrasonic images. Hughes has applied the entropy concept to the analysis of signals observed in ultrasonic experiments and successfully demonstrated the classification of various defects in plexiglass. His work is described in "Analysis of Digitized Waveforms Using Shannon Entropy", by M. S. Hughes, JASA, Vol. 93, No. 2, pp. 892–906 (1993). N. J. I. Mars has exploited mutual information in time delay estimation for electroencephalographic signals, as discussed in "Time Delay Estimator for EEG Analysis Based on Information Theory Coherence and Time Delay Estimation", by N. J. I. Mars, IEEE Press, pp. 410–412 (1993).

All of the research efforts mentioned above are related to sonar detection, classification and range estimation. However, the detection of acoustic signals emanating from an underwater source, and buried in random sea noise, is beyond the scope of the prior art teachings.

In a military environment at sea, there is a need for a method to detect and analyze such acoustic signals to make known the presence of an underwater weapon or weapon-capable platform.

SUMMARY OF THE INVENTION

It is, therefore, an object of the invention to provide an entropy-based method for detecting radiated and/or reflected acoustic signals from an underwater source, wherein the signals are present in random background sea noise.

A further object of the invention is to provide a novel and innovative method for detecting and analyzing acoustic signals, which is entirely different from that of conventional signal/information processing. The new method utilizes Shannon entropy theory as a tool for sonar signal processing with emphasis on detection, classification, and localization leading to a superior sonar system.

With the above and other objects in view, as will hereinafter appear, a feature of the invention is the provision of a method for detecting radiated and reflected acoustic signals from an underwater source, which are present in a random noise environment and form an output therewith, the method comprising the steps of operating an entropy-based acoustic receiver to receive the output, and calculating the entropy of the received output. The calculated entropy is compared with a selected entropy threshold value. If a substantial difference is revealed by the comparison, it is indicative of the presence of an acoustic signal from an underwater source. If less than a substantial difference is revealed by the comparison, it is indicative of lack of presence of an acoustic signal from an underwater source.

The above and other features of the invention, including various novel details of combinations of method steps, will now be more particularly described with reference to the accompanying drawings and pointed out in the claims. It will be understood that the particular method embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

The signal detection and processing method described herein is based on the concept of the entropy of a random process, which is an application of information theory. The fundamental quantities of information theory are entropy, relative entropy and mutual information, which characterize the behavior of a long sequence of random variables. The entropy, relative entropy and the mutual information do not depend on the actual values taken by the random variable but depend only on the probabilities. The probability distribution depends on many variables, such as sampling rate, quantization level, signal to noise ratios, and the like. The entropy is a measure of uncertainty of a random variable; i.e., entropy is the minimum descriptive complexity of a random variable. The entropy $H(X)$ of a discrete random variable (X) is defined by:

$$H(X) = -\sum_i p_i(x) \log p_i(x) \quad (1)$$

where (x) is a definite value for random variable X; and where $P_i$ is a probability factor that the random variable X will have a value of (x); and where $H(X) \geq 0$ and $0 \leq p(x) \leq 1$; that is, where entropy is always a positive number and where the probability factor is between 0 and 1.

Under constant energy constraints, the entropy of a received process having a finite number of sample points is maximum when there is all noise and no signal, that is, when the received process consists of random noise alone. The entropy of a received process decreases when a correlated signal is present, that is, when there is noise and signal combined.

Therefore, the following steps are used in practice of the method herein:

(I) Calculate entropy of a received underwater acoustic noise process;

(II) Compare the calculated entropy with a selected entropy threshold value to find the difference therebetween, and, (III) Make a decision: It is assumed that if the difference is large between the calculated entropy and the selected threshold value, an acoustic signal is present, and that if no large difference between the calculated entropy and the selected threshold value is present, no acoustic signal is present.

EXAMPLE

Figure 1:
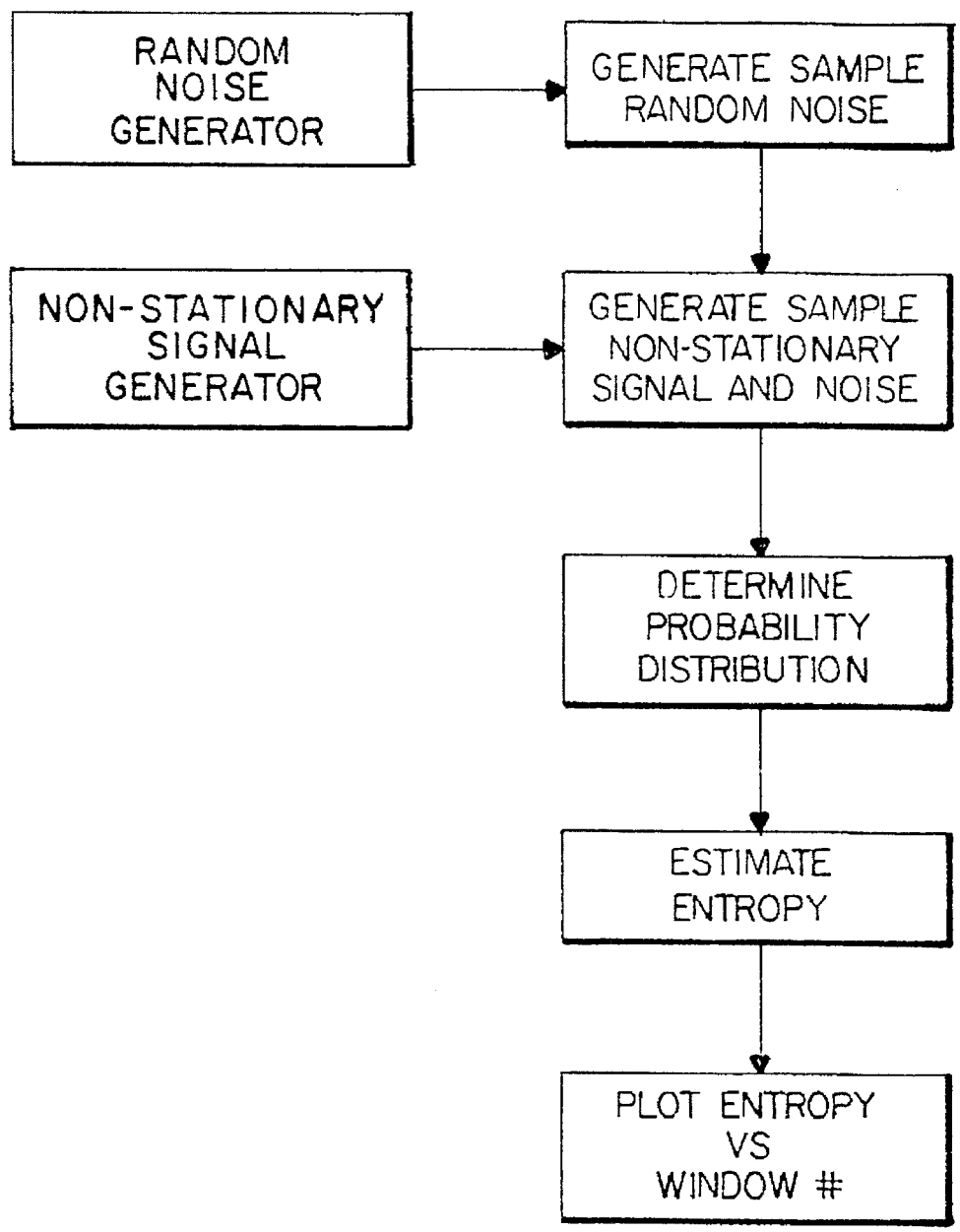
FIG. 1 is a block diagram illustrative of steps in entropy estimation in the given example.
Figure 2:
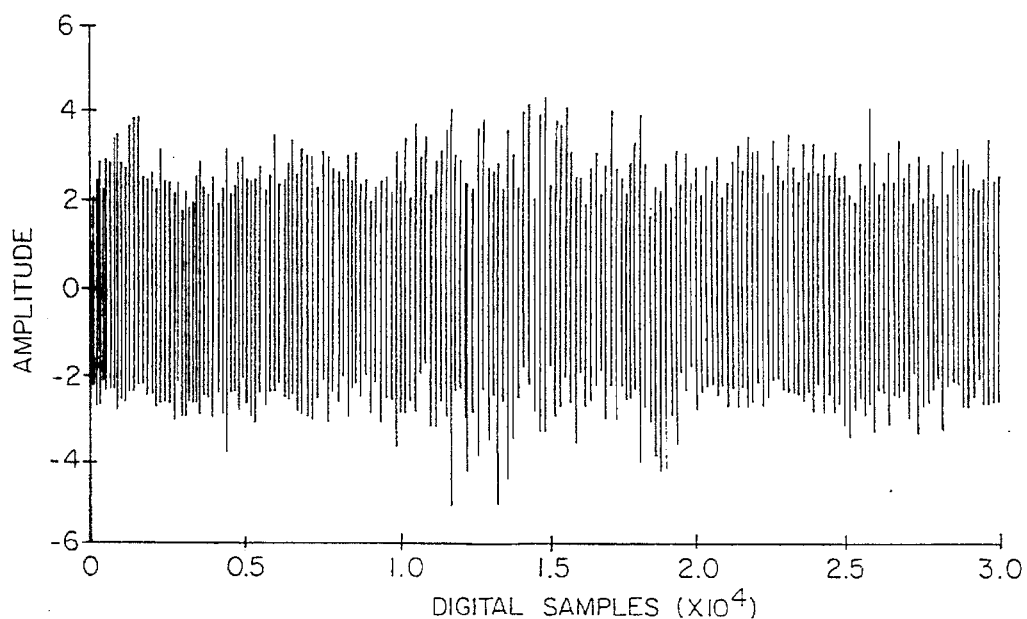
FIG. 2 is a depiction of received sonar signals including random background sea noise and, therein, an acoustic signal.

In order to demonstrate the concept that entropy H(X) can be used to detect sonar signals buried in random sea noise, there is presented the following example:

In this example, passive sonar received acoustic signals which were composed of simulated random sea noise and a non-stationary acoustic signal. A block diagram for entropy estimation process is shown in FIG. 1. In FIG. 2 there is shown a simulated passive sonar signal which is composed of the random noise and the non-stationary acoustic signal. Underwater sources generate and radiate non-stationary signals which are often neglected in traditional signal processing methods, and usually not exploited to enhance sonar system performance.

Figure 3:
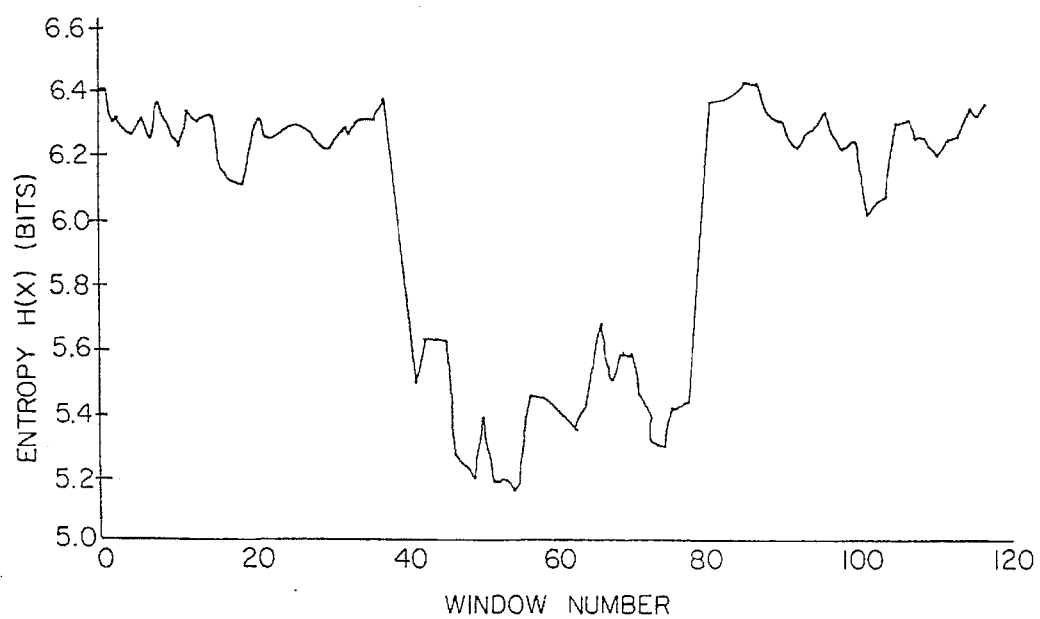
FIG. 3 is a graph illustrative of the entropy of the random noise and acoustic signal illustrated in FIG. 2.

In the example depicted in FIGS. 2 and 3, there are 30,000 digital samples or points. As shown in FIG. 2, the vertical axis represents the amplitude of either noise alone or noise plus acoustic non-stationary signal. The horizontal axis represents the digital samples, or points, as a function of time with a non-stationary signal superimposed over the random noise starting at digital sample or point number 10,001 to 20,000. Thus, the first 10,000 digital samples or points contain random noise, the next 10,000 digital samples from 10,001 to 20,000 contain random sea noise in combination with a non-stationary signal, and the last 10,000 digital samples or points contain random sea noise only. The amplitude plotted along the vertical axis is divided arbitrarily into 64 equal parts for data compression purposes and is thus estimated with 6 bits (powers of 2) amplitude. Quantization on a window of 1,000 digital samples and points with 75% overlap is used to estimate entropy. In other words, windows 1, 2, 3, 4, . . . start with digital samples or points 1–1,000; 251–1,250; 501–1,500; 751–1750, respectively. The value of entropy H(X) is obtained by calculating the probability p(x) samples having a certain amplitude (one of the 64 values) by dividing the number of samples having the particular amplitude to the total number of samples in that window. Having found p(x) for different amplitudes, one finds the entropy H(X) by using formula:

$$H(X) = -\sum_{i=1}^{64} p_i(x) \log_2 p_i(x) \quad (2)$$

FIG. 3 is then a plot of H(X) as a function of window number. The regions where there is sudden change of entropy from a high value to a reduced value represents the presence of acoustic non-stationary signal. It can be seen that the entropy goes down from window #40 to window #79 as expected, because these windows contain the signal plus noise, whereas other windows contain noise only, and, as a result, uncertainty increases. If a threshold at 5.8 bits is applied, non-stationary signals are evidenced below the threshold.

Thus, there is provided an entropy-based method for detection of acoustic signals emanating from an underwater source and buried in random background sea noise, leading to improved detection of underwater weapons and/or weapon platforms.

It is to be understood that the present invention is by no means limited to the particular method herein disclosed and/or shown in the drawings, but also comprises any modifications or equivalents within the scope of the claims.

What is claimed is:

1. A method for detecting radiated and reflected acoustic signals from an underwater source, wherein the acoustic signals are present in a random noise environment and form an output therewith, the method comprising the steps of:

operating an entropy-based acoustic receiver to receive said output;

calculating the entropy of said output;

comparing the calculated entropy with a selected entropy threshold value;

wherein a substantial difference revealed by the comparison of the calculated entropy and the selected entropy threshold value is indicative of the presence of an acoustic signal from an underwater source; and wherein a less than substantial difference revealed by the comparison of the calculated entropy and the selected entropy threshold value is indicative of lack of presence of an acoustic signal from an underwater source.

2. The method in accordance with claim 1 wherein in order to calculate the entropy of said output, the entropy is estimated as to amplitude in bits on a window of digital points.

3. The method in accordance with claim 2 wherein said window is a sliding window with an overlap.

4. The method in accordance with claim 2 including the step of plotting said estimated entropy as a function of window number.

5. The method in accordance with claim 4 including the step of applying a threshold in bits to the plot derived from plotting said estimated entropy, to reveal the presence of non-stationary signals evidenced below said threshold.

* * * * *